UNITED STATES PATENT OFFICE.

HENRY J. MAYERS, OF CLEVELAND, OHIO, ASSIGNOR TO THE EMPIRE RUBBER COMPANY, A CORPORATION OF OHIO.

ART OF DEVULCANIZING RUBBER.

1,167,359. Specification of Letters Patent. Patented Jan. 4, 1916.

No Drawing. Continuation of application Serial No. 664,333, filed December 7, 1911. This application filed February 17, 1912. Serial No. 678,219.

*To all whom it may concern:*

Be it known that I, HENRY J. MAYERS, a citizen of the United States, and a resident of Cleveland, Cuyahoga county, and State of Ohio, have invented new and useful Improvements in the Art of Devulcanizing Rubber, of which the following is a specification.

This application is filed as a continuation of application Serial No. 664,333, filed December 7, 1911, for the same subject matter.

In an application filed under date of December 7, 1911, by Samuel E. Allen, Serial No. 664,372, is described an invention which consists in a new and improved process for devulcanizing rubber producing a new and improved product as well as the elimination of fibrous material, if any be present; said invention involving two discoveries; (1) that a certain kind of oil has the capability of devulcanizing rubber, and (2) the discovery that this may be availed of on vulcanized goods containing fiber with the action of a fiber destroying agent; preferably concurrent in a single operation.

The present invention involves the further discovery that the qualities of the product may be improved by the modifications in the process hereinafter described.

In order to make my description complete, I will describe the whole process inclusive of my modifications.

The oil employed in my process is a distillate of pine wood having a specific gravity between that of oil of turpentine and that of resin oil. In other words, between about .88 and .96 at 15° C. More specifically, the oil that I have employed is about from .93 to .95 specific gravity and may be obtained as a distillate from the stumps of long leaf pine trees (*Pinus palustris*) by distilling according to the well known resin or other bath process wherein the liquid of the bath has a boiling point above that of the oil and subsequent redistillation. This oil is to be found on the market and may be further identified by the fact that the greater part of its bulk in a dry still will distil over at a temperature of between 200 and 220 C. The preferable specific gravity is from .935 to .945 at 15 C. I subject such oil to a refining distillation the effect of which is to eliminate the resinous constituents, such as rosin, pitch and tar and the product of which refining distillation therefore may be designated as deresinated oil of pine. I give the following examples of this refining distillation process.

Example 1 started with a commercial oil of the kind above referred to having a specific gravity of about .945 and an optical rotation of about minus 3° 54'. This starting oil is subjected to steam distillation either by the passage of steam or by the heating of the oil in the presence of water until the distillate begins to grow dark. The temperature of the distilling vapors is with trifling variations about 212° F. The product of this distillation showed a specific gravity of .943 and an optical rotation of minus 3° 15'.

Example 2 started with an oil of the same specific gravity and rotation and the distillation was conducted under the same conditions excepting that salt (sodium chlorid) was added in the proportion of 165 grams of salt to 2500 cc. of oil and 3000 cc. of water. The product of this example showed a specific gravity of .943 and an optical rotation of minus 3° 15'.

Example 3 started with oil of the same specific gravity and optical rotation and the distillation was conducted under the same conditions as in the second example excepting that to the oil, water and salt was added amyl acetate in the proportion of 25 cc. The product of this example showed a specific gravity of .942 and an optical rotation of minus 3° 15'.

Example 4 started with similar oil having a specific gravity of .943 and an optical rotation of minus 4° 24' and resulted in a finished oil product having a specific gravity of .940 and an optical rotation of minus 4° 0'. This 4th example of the process was carried on as follows: 54 pounds of ordinary salt (sodium chlorid) were dissolved in 41 gallons of water, to which solution were added 800 pounds of said oil; 20 pounds of eucalyptus globulus, 20 pounds of oil of citronella and 8 pounds of amylacetate. The mass was distilled slowly in a copper still of about 300 gallons capacity heated by steam coils containing steam at about 40 pounds pressure. A thermometer placed in the vapor at the top of the still showed about 212° F. This distillation occupied about 30 hours. I have also found in the production of the oil set forth in this example (4) that the salt and amylacetate may be omitted, and equally good results obtained by such oil in the process of devulcanization.

In each of the above examples, the product was dried by decantation and the product of each example forms a slightly turbid solution in equal volumes of 70% grain alcohol at ordinary temperature.

In devulcanizing rubber containing no fiber, known in the trade as pure gum stock, I proceed as follows: The rubber is ground so as to pass through a 3 to 5 mesh screen and placed in the mixing tank. Water is added to just submerge the rubber. The said oil is distributed over the surface and mixed either by hand or machinery. The proportions are about as follows: 200 lbs. pure gum stock, 600 lbs. water, 17 lbs. said oil.

The mass is dumped into a closed devulcanizing tank which is run into a devulcanizing oven where it is inclosed so as to maintain pressure and where it is allowed to remain for about 15 hours at a temperature and pressure corresponding with about 100 lbs. steam pressure (327 F.) applied either by admitting the steam into a surrounding steam jacket or directly into the devulcanizing oven. The mass is then removed from the tank and batched in a washer and dried.

In devulcanizing rubber containing cotton fiber such as old automobile tires, I proceed as follows: The rubber is ground so as to pass through a 3 to 5 mesh screen and placed in a closed mixing tank. A solution of sulfuric acid in proportions as below is added. The said oil is distributed over the surface and mixed by machinery or hand. The remainder of the process is the same as with the pure gum stock. The proportions are as follows: 200 lbs. ground tires, 800 lbs. water, 2 gallons sulfuric acid, 3 gallons said oil.

In devulcanizing rubber containing more or less wool fiber mixed with the cotton, such as old rubber boots and shoes, I proceed as follows: The rubber is ground so as to pass through a 3 to 5 mesh screen and placed in a closed mixing tank submerged with a 2% solution of sulfuric acid and allowed to stand for 12 hours at ordinary temperature. The said oil is then distributed over the surface and mixed. Then more sulfuric acid is added. The remainder of the process is as before. The proportions are as follows: 200 lbs. ground boots and shoes, 600 lbs. water acidulated with 2% sulfuric acid, 2 gallons sulfuric acid, 3 gallons said oil.

Instead of a devulcanizing tank in a stationary devulcanizer, a double jacketed revolving devulcanizer may be employed with the heat and pressure above specified.

I prefer to apply the heat by passing a current of steam of about 100 lbs. pressure through the closed devulcanizing oven so that said steam circulates not only in contact with the cover over the mass being treated, but also in contact with the sides and bottom of the metal tank containing the mass and thereby applying the heat to the mass from every direction. The cover of the devulcanizing tank that I prefer to employ is a loose cover not necessarily excluding the steam.

I do not limit myself to sulfuric acid as the fiber removing agent, equivalents being possible. Excepting when expressly specified in particular claims, I do not limit myself to oil containing the other ingredients added in the refining process nor to the oil of long leaf variety of pine, nor to the more particular specific gravities mentioned nor to the oil obtained by the rosin bath process.

The product of devulcanized rubber produced as above set forth, I believe to differ from any product heretofore obtained in that it possesses superior efficiency for coating cloth known in the trade as "frictioning" and for any other purposes requiring freedom from refractoriness in working or requiring plasticity or ease of flow, and at the same time lending itself to the production of an efficient vulcanized product of high tensile strength. The explanation for these superior qualities of the product I am at the present time unable to furnish but believe them to be attributable to the superior devulcanization by my process.

I believe that the efficiency of the above described refining process in its effect upon the qualities of the product is largely due to the fact that it removes from the oil resin, pitch, tar and turpentine and that, therefore, the oil applied to the rubber may be said to be de-resinated and de-turpentinated, and I do not wish to be understood as limiting myself to the kind of refining process by which this is accomplished. I also believe that the presence of the oil of eucalyptus has a beneficial effect upon the action of the other oil in its effect upon the devulcanized rubber product.

What I claim and desire to secure by Letters Patent of the United States is:

1. The process of devulcanizing rubber which consists in subjecting the same to a bath containing de-resinated oil of pine.

2. The process of devulcanizing rubber which consists in subjecting the same to a bath containing a de-resinated and de-turpentinated oil of pine.

3. The process of devulcanizing rubber which consists in subjecting the same to a bath containing a de-turpentinated oil of pine.

4. The process of devulcanizing rubber which consists in subjecting the same to a bath obtained by the distillation of pine wood between .88 and .96 specific gravity and subsequently refined by distilling at a temperature of about 212° F. with water.

5. The process of devulcanizing rubber which consists in subjecting the same to a bath containing oil obtained by distilling pine wood at a specific gravity of between .88 and .96 and subsequently refined by distilling in conjunction with a salt.

6. The process of devulcanizing rubber which consists in subjecting the same to a bath containing oil obtained by distilling pine wood at a specific gravity of between .88 and .96 and subsequently refined by distilling in conjunction with oil of eucalyptus.

7. The process of devulcanizing rubber which consists in subjecting the same to a bath containing oil obtained by distilling pine wood at a specific gravity of between .88 and .96 and subsequently refined by distilling in conjunction with oil of citronella.

8. The process of devulcanizing rubber which consists in subjecting the same to a bath containing oil obtained by distilling pine wood at a specific gravity of between .88 and .96 and subsequently refined by distilling in conjunction with a salt and oil of eucalyptus.

9. The process of devulcanizing rubber which consists in subjecting the same to a bath containing oil obtained by distilling pine wood at a specific gravity of between .88 and .96 and subsequently refined by distilling in conjunction with a salt and oil of citronella.

10. The process of devulcanizing rubber which consists in subjecting the same to a bath containing oil obtained by distilling pine wood at a specific gravity of between .88 and .96 and subsequently refined by distilling in conjunction with a salt, oil of eucalyptus and oil of citronella.

11. The process of devulcanizing rubber which consists in subjecting the same to a bath containing oil obtained by distilling pine wood at a specific gravity of between .88 and .96 and subsequently refined by distilling in conjunction with amylacetate.

12. The process of devulcanizing rubber which consists in subjecting the same to a bath containing oil obtained by distilling pine wood at a specific gravity of between .88 and .96 and subsequently refined by distilling in conjunction with a salt and amylacetate.

13. The process of devulcanizing rubber which consists in subjecting the same to a bath containing oil obtained by distilling pine wood at a specific gravity of between .88 and .96 and subsequently refined by distilling in conjunction with a salt, oil of eucalyptus, oil of citronella and amylacetate.

In testimony whereof, I have hereunto signed my name in the presence of two subscribing witnesses.

HENRY J. MAYERS.

Witnesses:
C. W. EHRHE,
R. F. VALENTINE.